United States Patent [19]
McGrath et al.

[11] Patent Number: 5,504,902
[45] Date of Patent: Apr. 2, 1996

[54] MULTI-LANGUAGE GENERATION OF CONTROL PROGRAM FOR AN INDUSTRIAL CONTROLLER

[75] Inventors: Michael S. McGrath, Royal Oak; Lonny C. McKinnon, Bloomfield; Jack C. Pattee, Wixom; Gerald C. Wieczerza, Clawson, all of Mich.

[73] Assignee: Patriot Sensors and Controls Corporation, Clawson, Mich.

[21] Appl. No.: 160,957

[22] Filed: Dec. 1, 1993

[51] Int. Cl.$^6$ .................................................. G06F 9/44
[52] U.S. Cl. ................. 395/700; 364/222.82; 364/260.4; 364/280.4; 364/280.7; 364/DIG. 1
[58] Field of Search ....................................... 395/650, 700

[56] References Cited

U.S. PATENT DOCUMENTS

| | | | |
|---|---|---|---|
| 5,083,262 | 1/1992 | Haff, Jr. ................................ | 395/500 |
| 5,142,681 | 8/1992 | Driscoll et al. ....................... | 395/700 |
| 5,386,569 | 1/1995 | Harada et al. ......................... | 395/700 |

OTHER PUBLICATIONS

Article entitled "An Arithmetic Checksum for Serial Transmissions", by John G. Fletcher, IEEE Transactions on Communications, vol. Com. 30, Nov. 1, Jan. 1982.

*Primary Examiner*—Kevin A. Kriess
*Assistant Examiner*—John Q. Chavis
*Attorney, Agent, or Firm*—Brooks & Kushman

[57] ABSTRACT

A method and system for generating a control program executable by an industrial controller, wherein the control program is formed using instructions from a high-level text-based language and instructions from a ladder-based language. A source program is received by a host computer. At least one instruction of the source program in the high-level text-based language is displayed on a display device along with a corresponding ladder diagram of the source program in the ladder-based language. The source program is edited in either the high-level text-based language using a first editor or the ladder-based language using a second editor. Modifications of the source program made using the first editor and the second editor are converted to a lower-level language representation. The lower-level language representation is convertible to both the high-level text-based language and the ladder-based language, so that modifications made in the high-level text-based language dynamically update the ladder diagram display and modifications made in the ladder-based language dynamically update at least one line of displayed text.

54 Claims, 9 Drawing Sheets

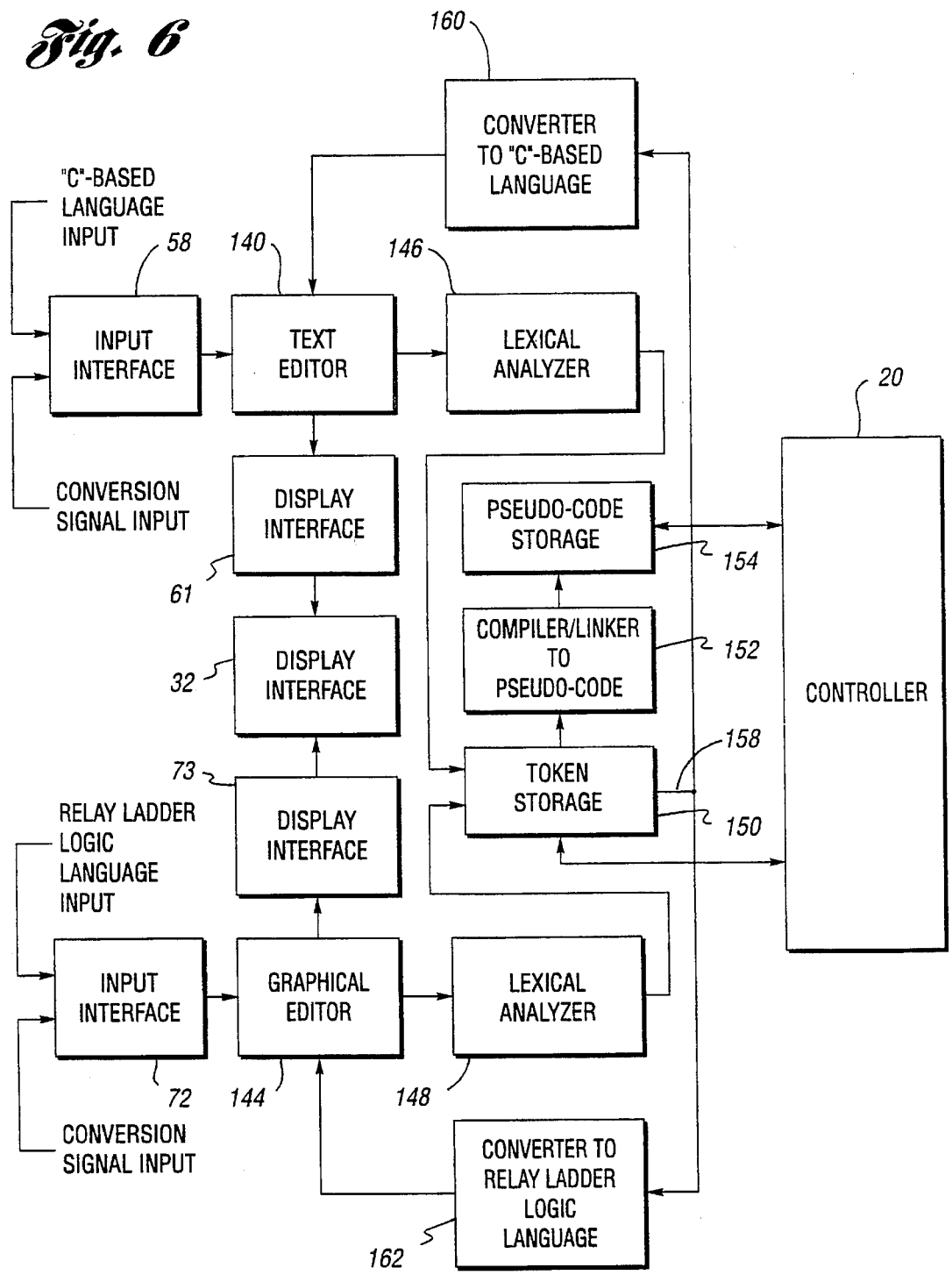

Fig. 7a  rung (PartIsLocked and (SafetyButton or OverRideSW))
  set DrillMotor:

Fig. 7c  mcr (PartIsLocked and (SafetyButton or OverRideSW))
  set DrillMotor:

MULTI-LANGUAGE GENERATION OF CONTROL PROGRAM FOR AN INDUSTRIAL CONTROLLER

TECHNICAL FIELD

The present invention relates generally to methods and systems for generating control programs for industrial controllers, and more particularly, to methods and systems for generating control programs using a high-level language.

BACKGROUND ART

Industrial controllers have been used for many years in industrial control applications. The advent of the industrial controller allowed the replacement of electromechanical relay panels, used for on-off sequencing of industrial devices, by solid-state power modules. Today, the industrial controller has evolved to include capabilities to perform data acquisition and storage, to execute complex mathematical algorithms, and to perform system troubleshooting, to name a few.

The industrial controller is programmed by storing instructions into an internal memory circuit. Some controllers are programmed by entering the instructions using a keyboard on a control panel. Many modern controllers are programmed using a host computer equipped with a suitable software package. Using the suitable software, high-level instructions are entered into the host computer and compiled to form a control program. The control program is transferred to the controller either by a communication link between the controller and the computer, or by storing the control program in a non-volatile memory for physical transfer to the controller.

Some current systems use the host computer for accepting instructions in a high-level language for compilation into the control program for transfer to the controller. Other systems accept instructions in a ladder-based language for compilation into the control program. Further, some systems convert instructions in the ladder-based language to corresponding instructions in the high-level language so that the high-level language instructions can be compiled to form the control program.

SUMMARY OF THE INVENTION

It is thus an object of the present invention to provide a method of and system for generating a control program executable by an industrial controller, wherein the control program is formed using instructions from a high-level text-based language and instructions from a ladder-based language.

In carrying out the above objects, the present invention provides an improvement of a method of generating a control program utilizing a computer system, the control program executable by a controller which is capable of controlling the operation of one or more devices. One or more instructions of a source program in a high-level text-based language is received within the computer system. At least one of the one or more instructions of the source program in the high-level text-based language are converted into corresponding instructions in a ladder-based language.

Further in carrying out the above objects, the present invention provides an improvement of a method of generating a control program utilizing a computer system, wherein the control program is executable by a controller which is capable of controlling the operation of one or more devices. One or more instructions of a source program in a high-level text-based language is received by the computer system. At least one of the one or more instructions of the source program in the high-level text-based language is displayed as text on a display device. The one or more instructions of the source program are converted into corresponding instructions in a ladder-based language such that the corresponding instructions of the source program, so converted, can be converted back into the one or more instructions in the high-level text-based language. At least one of the corresponding instructions in the ladder-based language is displayed as a ladder diagram on the display device.

Still further in carrying out the above objects, systems are provided for performing the steps of the aforementioned methods.

These and other features, aspects, and advantages of the present invention will become better understood with regard to the following description, appended claims, and accompanying drawings.

BRIEF DESCRIPTION OF THE DRAWINGS

FIG. 6 is a block diagram of a specific embodiment for generating the control program;

FIGS. 7a–7d illustrate the RUNG statement and the MCR statement; and

BEST MODES FOR CARRYING OUT THE INVENTION

Figures 1, 2:
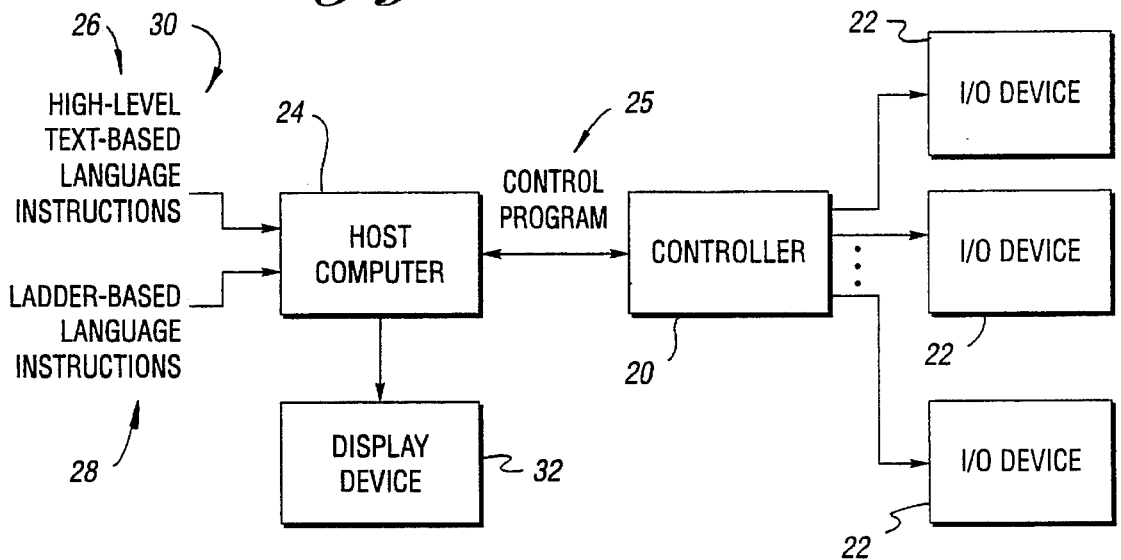
FIG. 1 is a block diagram of a programmable control system.
FIG. 2 is a flow chart of a method for generating the control program.

A system for controlling the operation of one or more input/output devices is shown in the block diagram of FIG. 1. Illustrated is a controller 20 operatively connected to each of the one or more devices 22. The controller 20 can be described generally as an electronic apparatus which uses a programmable memory for an internal storage of instructions for implementing desired functions to control, through digital or analog input/output modules, various types of machines or processes. The classes of functions which can be implemented include logic, sequencing, timing, counting, and arithmetic functions. The one or more devices 22 can comprise input providing devices such as push buttons, switches, relay contacts, thumb wheels, flow meters, level meters, and thermometers; and output controlling devices such as indicator lights, relay coils, solenoid valves, motor starters, pumps, and stepper motors.

A host computer 24 is operatively connected to the controller 20 for providing a control program 25 comprising the instructions for implementing the desired functions. The host computer 24 generates the control program based upon instructions received in a high-level text-based language 26 and instructions received in a ladder-based language 28. The high-level text-based language instructions 26 along with the ladder-based language instructions 28 form a source program 30 which comprises high-level instructions for implementing the desired functions to control the one or more devices 22. Once programmed, the operative connection between the host computer 24 and the controller 20 is no longer necessary.

A programming language is characterized as being a high-level language if higher-order features are included therein. Examples of higher-order features include procedure and function declarations, nested expressions, user-defined data types, and parameter passing, which are not normally found in lower-level languages. Further, high-level languages do not reflect the structure of any one type of computer, which allows machine-independent source programs to be written. Some currently-popular high-level text-based languages include C, PASCAL, FORTRAN, ADA, and LISP. In contrast, a ladder-based language is one designed for compatibility with the types of control devices that have been replaced by programmable controllers. Specifically, the ladder-based language allows elements such as normally-open and normally-closed contacts, and relay coils, to be arranged in horizontal rows, called rungs. The programmable controller typically solves the logic of a resulting ladder diagram by scanning the ladder diagram rung-by-rung.

The host computer 24 is coupled to a display device 32 to provide one or more displays representative of the high-level text-based instructions 26 and the ladder-based language instructions 28 received by the host computer. The display device 32 is employed to aid in the development of the source program which is to be compiled to form the control program.

FIG. 2 shows a flow chart for a method of generating the control program 25 executable by the controller 20. Upon an initiation to generate the control program in block 40, one or more instructions of a source program in a high-level text-based language is received by the host computer 24 in block 42. The one or more instructions of the source program is received by standard means of input for computers, such as a keyboard, a floppy disk, a hard disk, or any combination thereof. In block 44, at least one of the one or more instructions of the source program in the high-level text-based language is converted into corresponding instructions in a ladder-based language. Next, at least one of the source program in the high-level text-based language and the source program in the ladder-based language is compiled to form the control program in block 46. The method is terminated thereafter by return block 48, at which time the control program can be downloaded to the controller 20, or a modified source program can be received for compilation into a modified control program.

Figure 3:
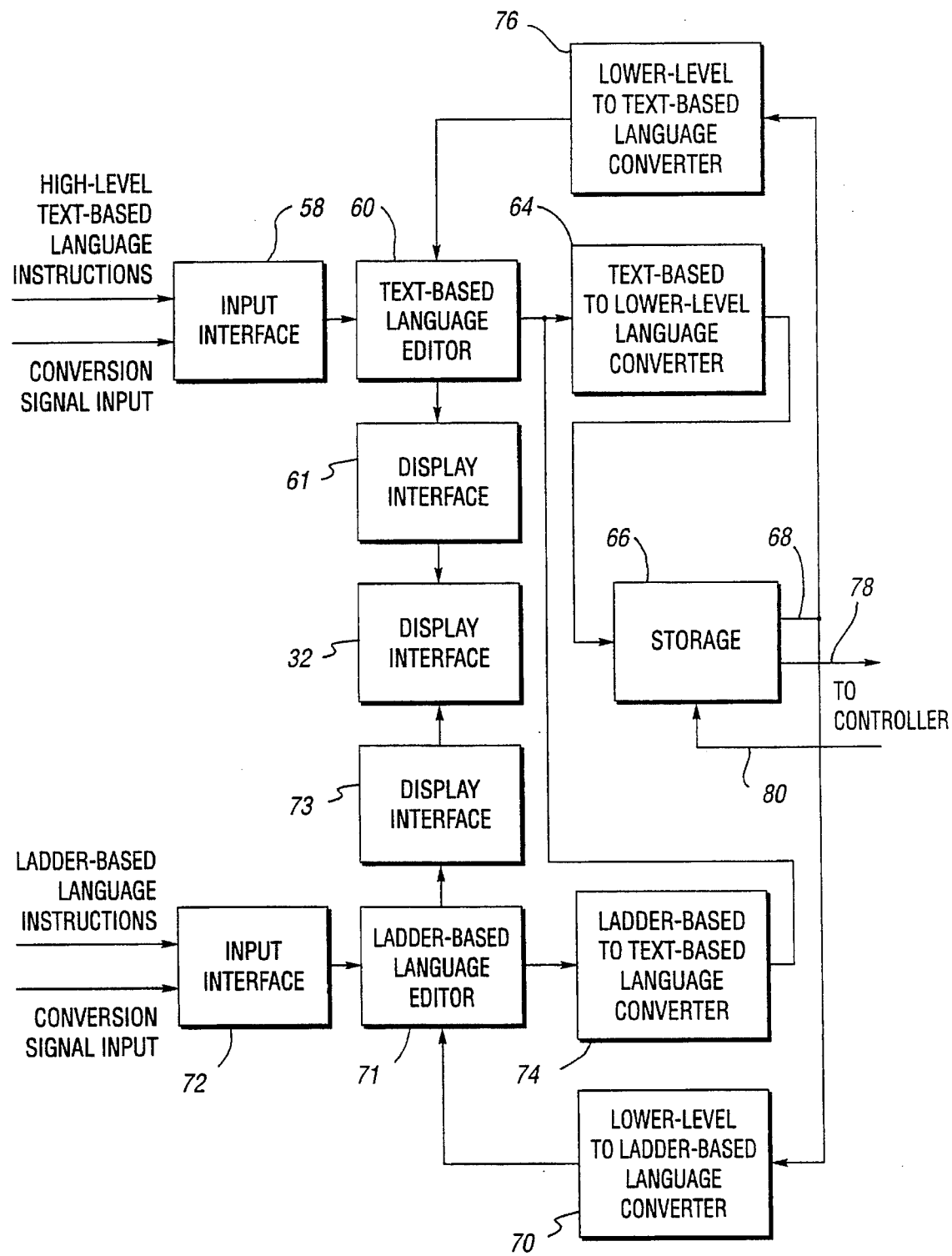
FIG. 3 is a block diagram of a system embodiment for editing the source program and generating the control program.

Turning now to FIG. 3, a system for editing a source program in the host computer 24 compilable into a control program is shown. A first input interface 58 provides means for receiving an input of one or more instructions in the high-level text-based language for processing within the host computer 24. The first input interface 58 can be formed of a standard input device, such as a keyboard, a floppy disk drive, a hard disk drive, or a mouse, or any combination thereof. A first user-operated editor 60 within the host computer 24 is coupled to the first input interface 58 to allow editing of the source program. The first editor 60 is coupled via a first display interface 61 to the display device 32 for displaying at least one of the one or more instructions of the source program in the high-level text-based language. The combination of the first display interface 61 and the display device 32 is generally capable of providing either a single-medium presentation or a multimedia presentation. The display device 32 can employ a standard mode of display, such as a visual display, along with alternative modes of display. An example combination has the display device 32 comprising a video monitor or the like, capable of displaying both text and graphics, and the first display interface 61 comprising a video interface card.

A text-based to lower-level language converter 64 is operatively connected to the first editor 60 to provide a lower-level language representation of the source program. Specifically, at least one of the one or more instructions of the source program in the high-level text-based language is converted into corresponding instructions in the lower-level language. The lower-level language representation of the source program preferably resembles the control program to be downloaded to the controller 20, while still retaining the processor-independent characteristic of the high-level text-based language representation. The step of converting is initiated upon reception of a first conversion signal generated by a user and received by the first input interface 58.

A storage device 66, such as a memory or a magnetic storage medium, is used to store the lower-level language representation of the source program. A first output 68 of the storage device 66 is applied to a lower-level to ladder-based language converter 70 in order to provide a ladder-based language representation of the source program. Specifically, the ladder-based representation comprises instructions which correspond to the at least one of the one or more instructions of the source program in the high-level text-based language.

The output of the lower-level to ladder-based language converter 70 is applied to a second editor 71 to allow editing of the source program in the ladder-based language. A second input interface 72 provides means for receiving an input of instructions in the ladder-based language. As with the first input interface 58, the second input interface 72 comprises input devices such as a keyboard, a floppy disk drive, a hard disk drive, a mouse, or the like. Moreover, if desired, the first input interface 58 can be employed as the second input interface 72.

The display device 32 is connected to the second editor 71 via a second display interface 73 so that a portion of the source program can be displayed as a ladder diagram on the display device 32. If desired, the first display interface 61 can be employed as the second display interface 73. The display device 32 can be configured to allow the ladder diagram and the at least one line of text to be displayed either simultaneously or individually. For a simultaneous display, the ladder diagram and the at least one line of text would preferably correspond to the same portion of the source program, namely, the same at least one of the one or more high-level text-based instructions of the source program. Furthermore, the user has an option to scroll through the one or more instructions of the source program so as to scroll through the text and the ladder diagram simultaneously.

The second editor 71 is also coupled to a ladder-based to text-based language converter 74 so that the source program in the ladder-based language can be converted into the high-level text-based language. Specifically, instructions in the ladder-based language are converted to corresponding instructions in the high-level text-based language. The step of converting is initiated upon reception of a second conversion signal generated by a user and received by the second input interface 72. The output of the ladder-based to text-based language converter 74 is applied to an input of the text-based to lower-level language converter 64. The resulting cascade of the ladder-based to text-based language converter 74 and the text-based to lower-level language converter 64 provides a conversion from the ladder-based language to the lower-level language. Hence, the cascade acts to convert instructions in the ladder-based language to corresponding instructions in the lower-level language.

The first output 68 of the storage device 66 is applied to a lower-level to high-level text-based language converter 76 so that the first editor 60 can be updated based on modifications of the source program made using the second editor 71. Hence, the system operates to accept instructions in either the high-level text-based language or the ladder-based language, and in response to a conversion signal, is capable of displaying the source program in both the high-level text-based language and the ladder-based language.

The storage device 66 has a second output 78 to allow a transfer of the control program based on the lower-level representation of the source program from the host computer 24 to the controller 20. The step of compiling the control program to form an executable control program can be performed in either the host computer 24 or the controller 20.

An input line 80 of the storage device 66 allows a control program residing in the controller 20 to be transferred to the host computer 24. The control program is then converted to a high-level language representation by the language converter 76 and to a ladder language representation by the language converter 70, for application to the first editor 60 and the second editor 71, respectively. Modifications to the control program can be made in either the high-level language or the ladder language. A modified control program can be downloaded back to the controller 20 via output line 78. Once transferred to the controller 20, the control program can be translated into machine code by the controller 20.

Figure 4:
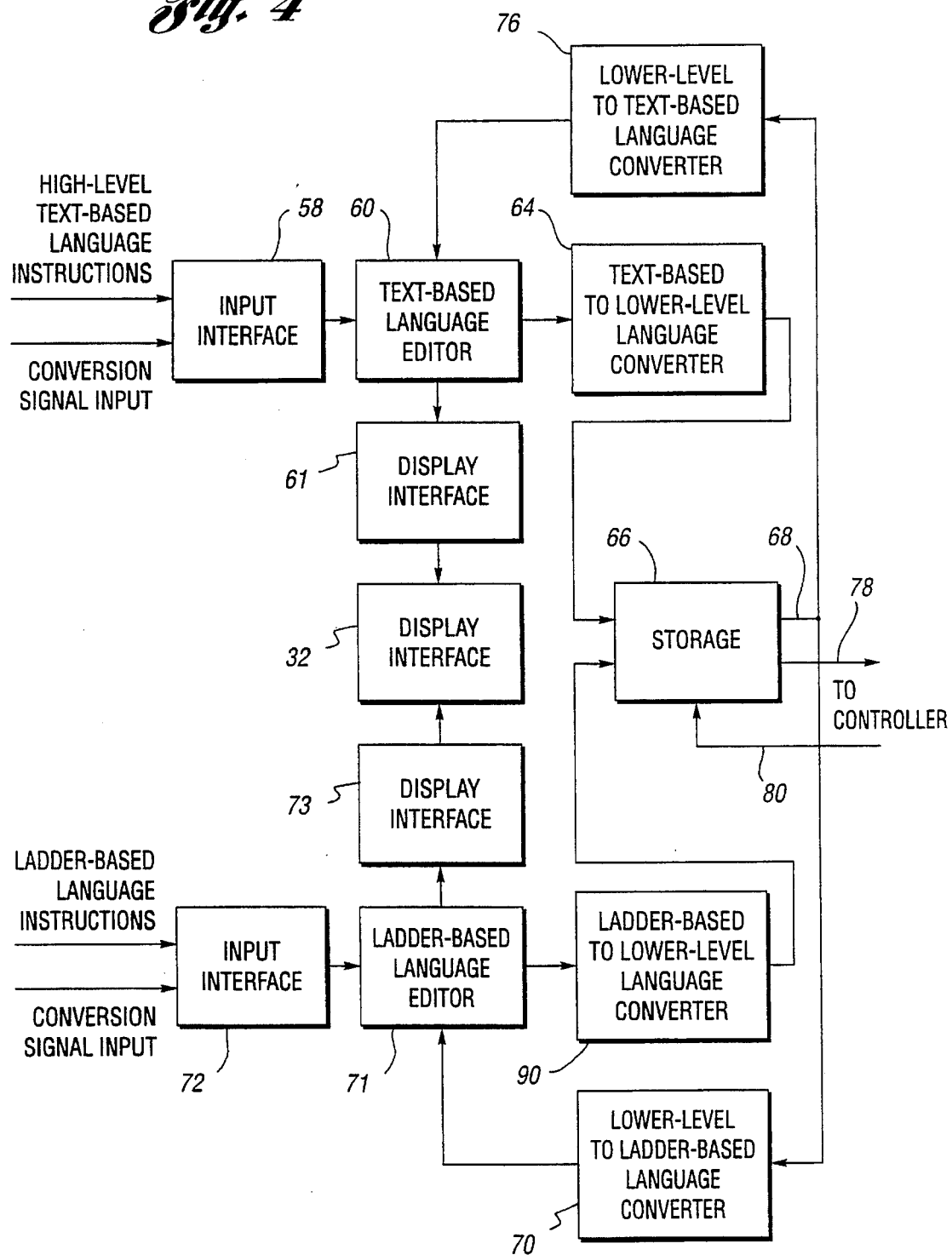
FIG. 4 is a block diagram of a second system embodiment for editing the source program and generating the control program.

A second embodiment of a system for editing a source program in the host computer 24 is illustrated by the block diagram in FIG. 4. This embodiment includes the input interface 58, the first editor 60, the first display interface 61, the display device 32, the text-based to lower-level language converter 64, the storage device 66, the lower-level to ladder-based language converter 70, the second editor 71, the second input interface 72, the second display interface 73, and the lower-level to text-based language converter 76, with the same associated connections therebetween as in the embodiment of FIG. 3. However, the language converter 74 is replaced by a ladder-based to lower-level language converter 90, whose output is applied directly to the storage device 66. Specifically, the ladder-based to lower-level language converter 90 converts instructions in the ladder-based language to corresponding instructions in the lower-level language. Thus, the second embodiment provides a direct conversion from the ladder-based language to the lower-level language as opposed to the two step conversion by language converters 74 and 64 in the embodiment of FIG. 3. The difference between the two embodiments would be substantially transparent to a user of the system.

Figure 5:
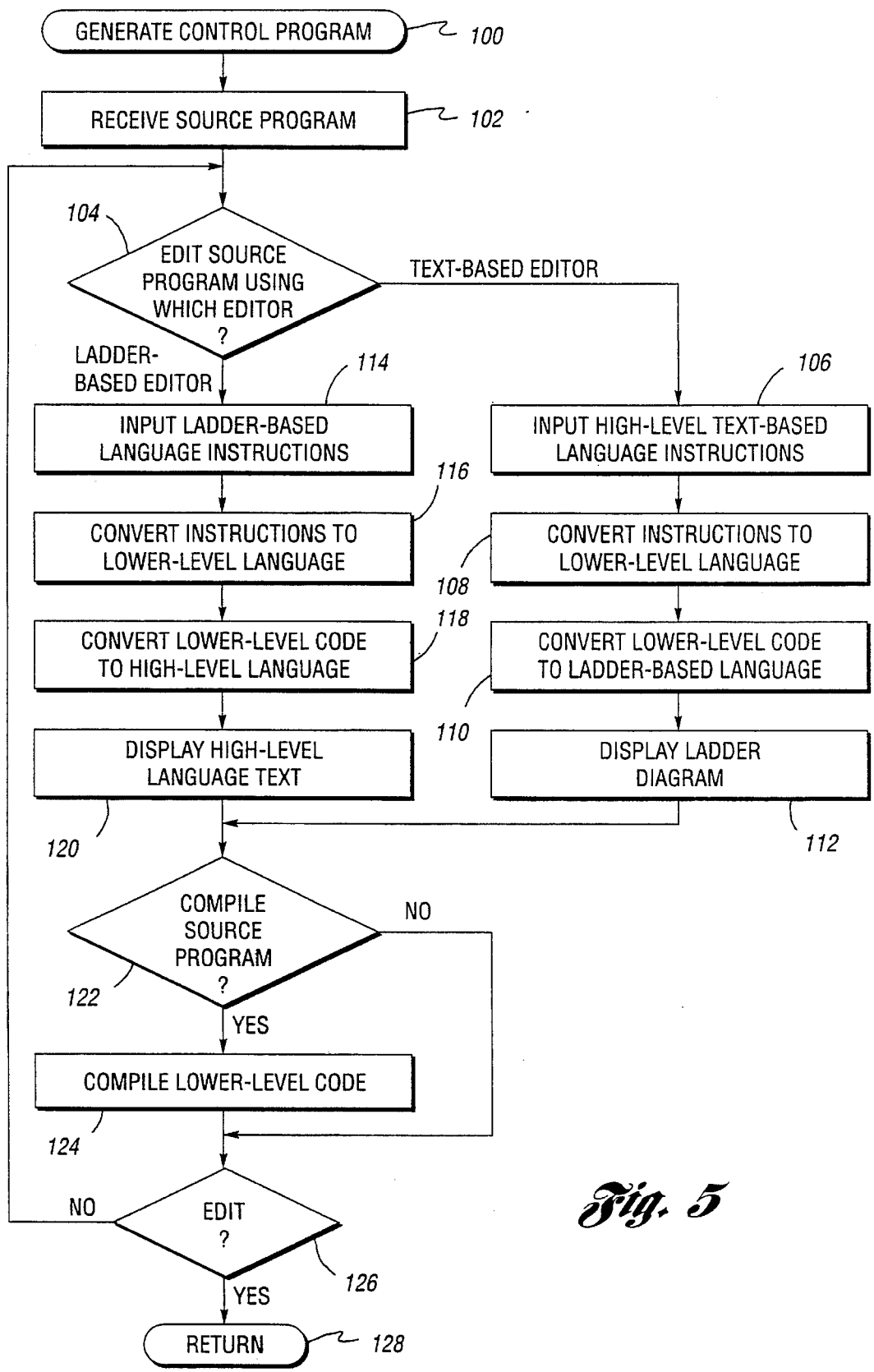
FIG. 5 is a flow chart of a method for generating the control program.

An embodiment of a method of generating the control program using the first editor 60 and the second editor 71 is illustrated by the flow chart in FIG. 5. Upon an initiation to generate the control program in block 100, one or more instructions of the source program in the high-level text-based language is received by the host computer 24 in block 102. In conditional block 104, either the first editor 60 or the second editor 71 is selected for editing the source program. If the first editor 60 is selected, then further high-level text-based language instructions are inputted in block 106. After receiving the first conversion signal, which can be generated either by an action of the user, or automatically after a selected number of instructions have been inputted, or once editing is completed, the instructions in the text-based language are converted to corresponding instructions in the lower-level language by block 108. In block 110, the instructions in the lower-level language are converted to corresponding instructions in the ladder-based language. At least one of the corresponding instructions in the ladder-based language, preferably resulting from modifications of the source program in the high-level text-based language, is displayed on the display device 32 as a ladder diagram by block 112.

If the second editor 71 is selected in conditional block 104, then ladder-based language instructions are inputted in block 114. After receiving the second conversion signal, which can be generated either by an action of the user, or automatically after a selected number of instructions have been inputted, or once editing is completed, the instructions in the ladder-based language are converted to corresponding instructions in the lower-level language by block 116. In block 118, the instructions in the lower-level language are converted to corresponding instructions in the high-level text-based language. At least one of the corresponding instructions in the text-based language, preferably resulting from modifications of the source program in the ladder-based language, is displayed on the display device 32 as a ladder diagram by block 112.

After displaying either a modified ladder diagram in block 112 or modified high-level language text in block 120, conditional block 122 gives an option to compile the source program to form the control program. If compilation is desired, then the lower-level representation of the source program is compiled into the control program by block 124. After compiling the lower-level instructions in block 124, or if no compilation is desired in block 122, conditional block 126 is executed to allow the user either to further edit the source program or to exit the subroutine. If further editing is desired, then execution of the subroutine is transferred back up to conditional block 104. If no further editing is desired, then the subroutine is exited by return block 128.

FIG. 6 shows a more specific embodiment of a system for editing the source program in the host computer 24 for compilation into the control program for transfer to the controller 20. In this embodiment, a C-based programming language is selected as the high-level language. The C-based language comprises a subset of the instruction set of a standard C language along with a selected number of additional instructions created to facilitate an ease in translation between the C-based language and the ladder based language. One possible standard C language from which the C-based language can be formed is ANSI C. The ladder based language employed in this embodiment is a relay ladder logic language.

A text editor 140 within the host computer 24 is coupled to the first input interface 58 to allow an input of one or more lines of the source program in the C-based programming language. To facilitate the development of the source program with relative ease for the user, the text editor 140 operates in a similar manner as an editor of a word processor. The text editor 140 can include features such as ASCII file importing, automatic text formatting, string searching and replacing, and cut, paste and block-move capability. The text editor 140 can further include click, drag, and drop capabilities by including a mouse within the input interface 58. The text editor 140 is coupled by the display interface 61 to the display device 32 to display at least one line of text of the C-based language representation of the source program. Further, the at least one line of text can be displayed in a first software-driven window on the display device 32.

A graphical editor 144 within the host computer 24 is employed to facilitate editing of the source program based on an input of relay ladder logic language instructions received via the input interface 72. The graphical editor 144 is also coupled to the display device 142 so that the user can see graphical relay ladder logic commands representing a portion of a ladder diagram. The portion of the ladder diagram can be displayed in a second software-driven window on the display device 142, allowing the at least one line of text from the text editor and the portion of the ladder diagram to be viewed simultaneously. Alternatively, the at least one line of text and the portion of the ladder diagram can be displayed on respective panes of a common window.

Various methods of graphically editing a relay ladder logic diagram can be employed by graphical editor 144. For example, the graphical editor 144 can allow the user to modify the ladder diagram by means of clicking a mouse and dragging icons. A template editing mode can also be employed within the graphical editor 144, wherein the user can edit a relay ladder logic command by clicking the mouse on a portion of the ladder diagram. The graphical editor 144 responds in the template editing mode by displaying the selected command within a dialog box. The dialog box can comprise check boxes, radio buttons, combination boxes, and edit boxes which represent the applicable command. The user may then modify the command and parameters of the command using the dialog box. After completing the modification, the dialog box is removed from the display device 142 and a modified ladder diagram graphic is displayed.

The text editor 140 is operatively coupled to a first lexical analyzer 146. The first lexical analyzer 146 reads C-based language instructions, character-by-character, and groups the characters into larger units called tokens. The tokens are formed using lexical rules of the C-based language, such as which characters are valid, which characters may be used in identifiers, and what length an identifier may be. Lexical analysis removes all extraneous characters, such as spaces, from the C-based language version of the source program. A second lexical analyzer 148 is coupled to the graphical editor 144 to similarly convert relay ladder logic language instructions to tokens.

The tokens generated by the first lexical analyzer 146 and the second lexical analyzer 148 are applied to a token storage unit 150. To create the control program for the controller 20, the tokens within the token storage unit 150 are parsed, compiled and linked in block 152. The compiler 152 produces a set of generic opcodes which provides a pseudo-code representation of the source program. In the preferred embodiment, the pseudo-code commands comprise a one byte opcode followed by some number of parameter bytes. These opcodes do not necessarily relate directly to the instruction set of any specific processor, or to the controller 20. A benefit resulting from the use of pseudo-code is the ability to implement a high-level language and set of programming tools that are processor-independent. The benefit is especially valuable considering that the processor can take a variety of forms, such as a central processing unit, parallel processors, or a custom-produced arithmetic and logic unit.

The pseudo-code representation of the source program is stored in pseudo-code storage unit 154. The token storage 150 and the pseudo-code storage can be in the form of a computer memory or a file in a magnetic storage medium such as a floppy disk or hard disk. From the storage unit 154, the pseudo-code representation can be downloaded from the host computer 24 to the controller 20. The pseudo-code is then converted into machine language by the controller 20. Similarly, the tokens can be transferred between the token storage unit 150 and the controller 20.

An output 158 of the token storage unit 150 is applied to a first converter 160 for converting the tokens to corresponding instructions in the C-based language. The results of the compilation by the second compiler 160, namely, the corresponding instructions, are applied to the text editor 140. In a similar manner, the output 158 of the token storage unit 150 is applied to a second converter 162 to form relay ladder logic language instructions for application to the graphical editor 144. Thus, the embodiment of FIG. 6 operates to provide both a portion of the ladder logic diagram and at least one line of C-based language text in response to either C-based language instructions inputted to the text editor 140 or relay ladder logic language instructions inputted to the graphical editor 144.

In order to simplify the translation between the C-based language and the relay ladder logic language, the C-based language includes two conditional commands, RUNG and MCR. Both RUNG and MCR operate equivalently as an IF command for a logical true condition; in terms of the C-based programming language, each of the three commands would execute a series of statements within a command body, and in terms of the relay ladder logic language, each of the three commands would process every rung defined by the series of statements in the command body. For a logical false test expression with either the RUNG command or the MCR command, normal output functions, such as a SET command, within the command body are processed as follows: for each SET command found, the argument of the SET command is set to a logical false.

One with ordinary skill in the art will recognize that alternatives to the aforementioned RUNG and MCR commands can be employed for the purpose of promoting the bi-directional translation between C-based language instructions and relay ladder logic language instructions.

Figure 7B:
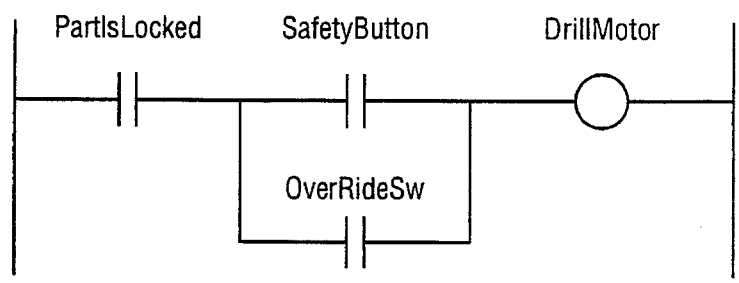
Figure 7B:
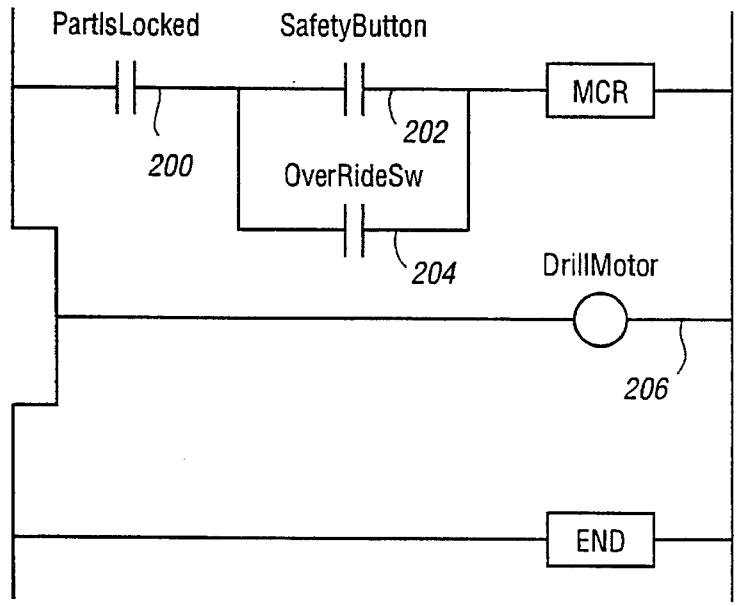

FIGS. 7a–7d illustrate differences in ladder diagrams between the RUNG command and the MCR command. FIG. 7a shows the use of the RUNG command in the C-based programming language. The test condition consists of a logical AND of a PartIsLocked Boolean variable with a logical OR of a SafetyButton variable with an OverRideSw variable. The command body comprises a SET command for setting a DrillMotor. The resulting relay ladder logic display is shown in FIG. 7b. Illustrated are a first normally open contact 200 for the PartIsLocked variable, a second normally open contact 202 for the SafetyButton variable, a third normally open contact 204 for the OverRideSw variable, and a relay coil 206 for setting the DrillMotor. It should be reemphasized that embodiments of the present invention would allow editing of this RUNG command in either the C-based language or the relay ladder logic language. For example, if one wanted to delete the OverRideSw from the illustrated RUNG within the source program, one could either delete the "OR OverRideSw" text using the text editor 140, or delete the third contact switch 204 using the graphical editor 144.

FIG. 7c shows an MCR command having the same test condition and the same command body as the RUNG command of FIG. 7a. The resulting relay ladder logic diagram for the MCR command of FIG. 7c is shown in FIG. 7d. Illustrated are the first contact switch 200 for the PartIsLocked variable, the second contact switch 202 for the SafetyButton variable, the third contact switch 204 for the OverRideSw variable, and the relay coil 206 for the DrillMotor.

Figure 8A:
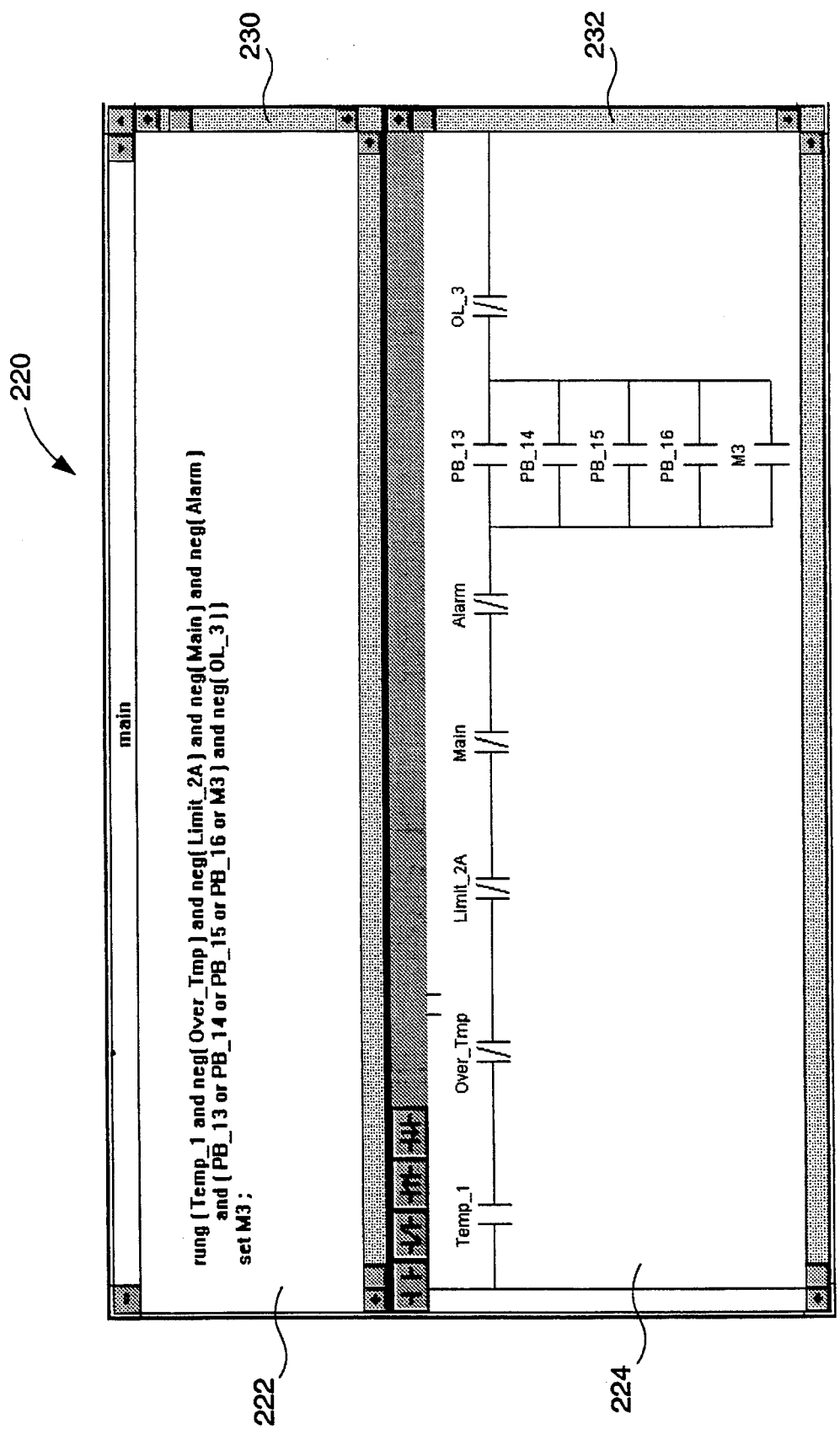
FIGS. 8a–8c show output of the display device in response to editing an instruction.
Figure 8B:
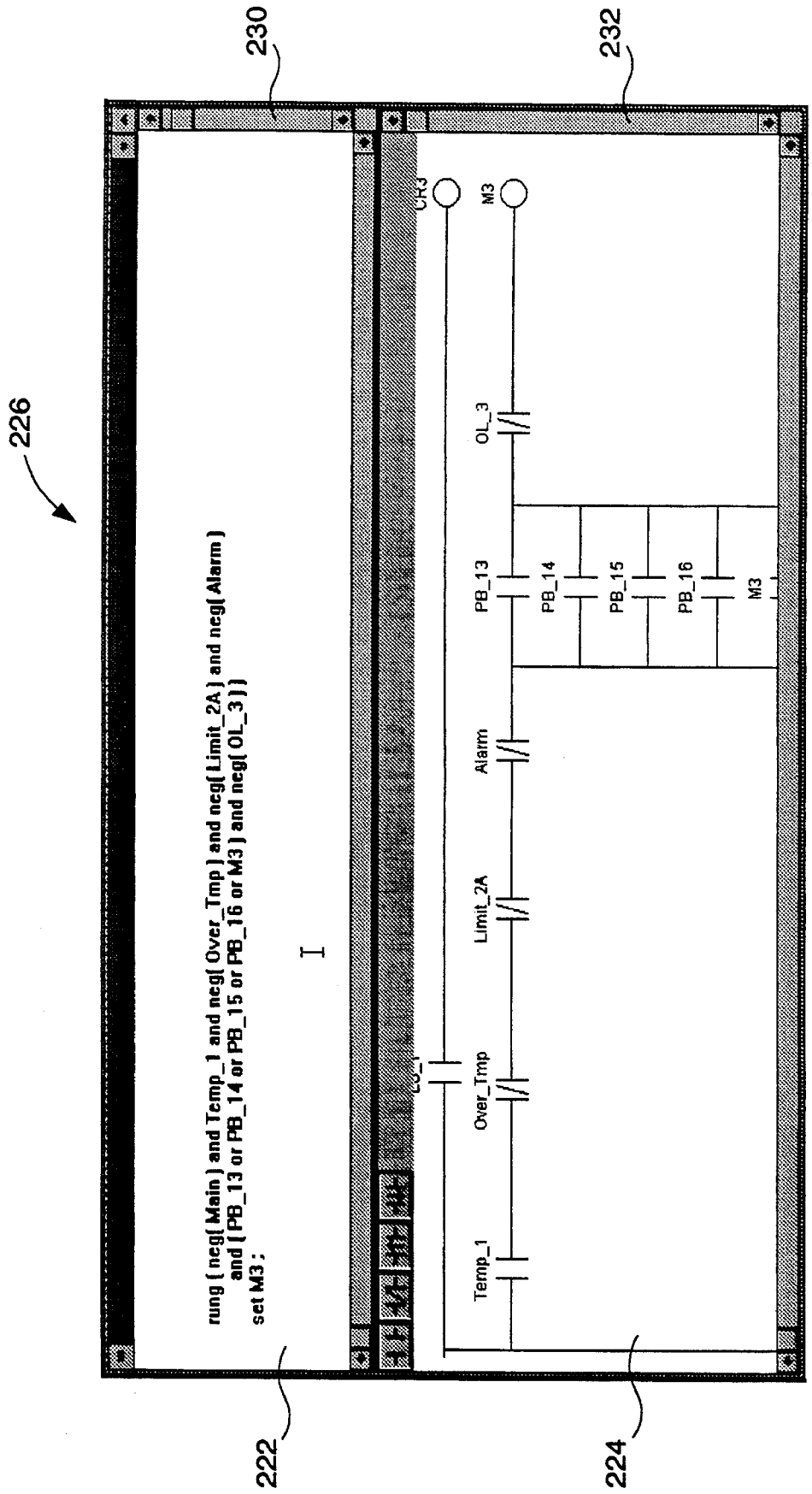
Figure 8C:
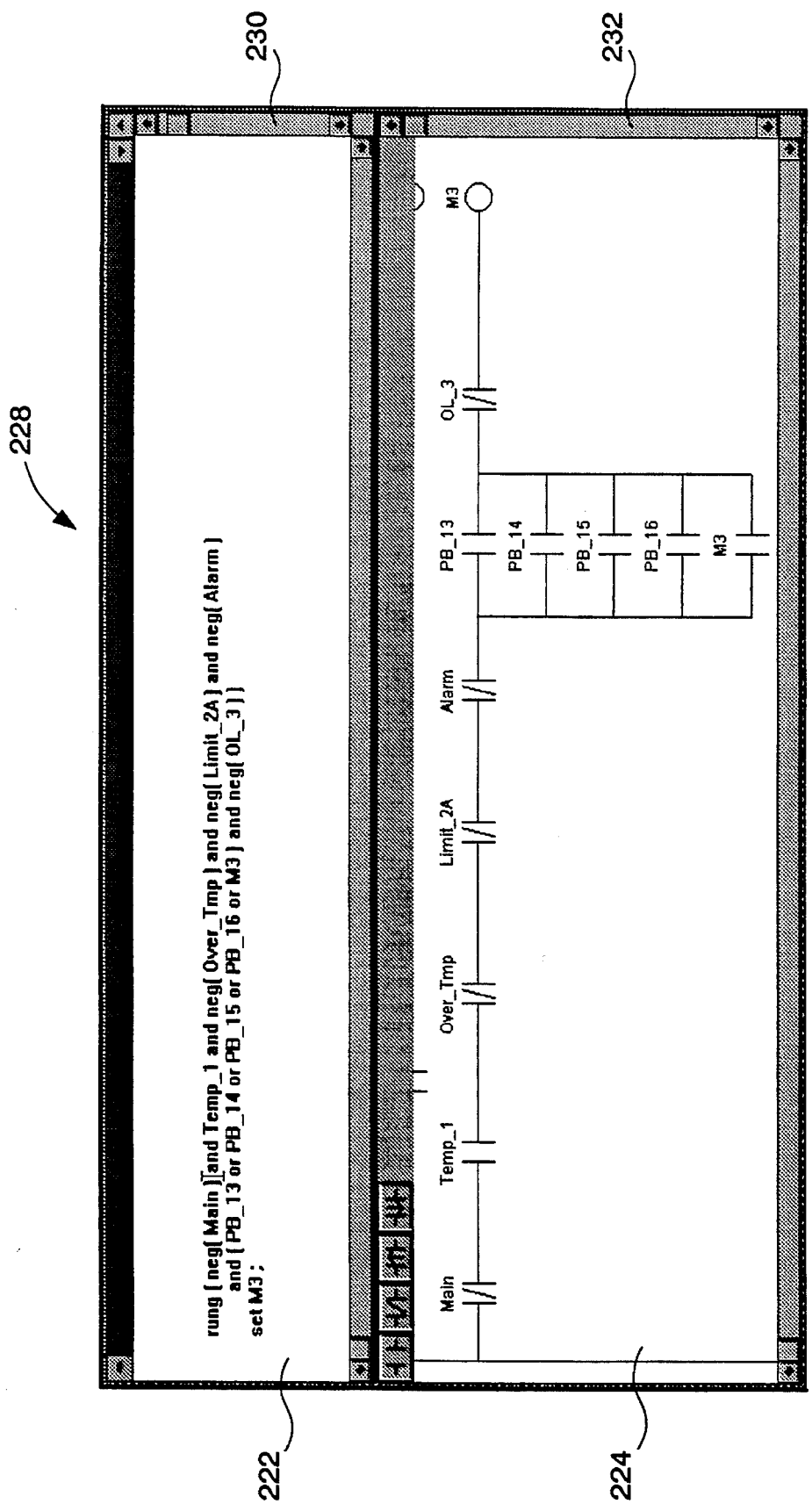

Turning now to FIGS. 8a–8c, example outputs of the display device 32 are shown as an instruction in the C-based programming language is edited. FIG. 8a shows a first display 220 comprising a C-based language window 222 and a relay ladder logic language window 224. The C-based language window 222 is displaying the text of a RUNG instruction while the relay ladder logic language window 224 is displaying a corresponding ladder diagram for the RUNG instruction.

Once the RUNG instruction has been edited in the C-based language window, but before the first conversion signal has been generated, the display device 32 outputs a second display 226 shown in FIG. 8b. The C-based language window 222 contains a modified instruction in FIG. 8b, but the relay ladder logic language window 224 has not been updated. Once the first conversion signal has been generated, which prompts the conversion of the C-based instruction to a corresponding ladder-based instruction, a third display 228 in FIG. 8c is seen on the display device 32. Here, the relay ladder logic language window 224 contains an updated ladder diagram corresponding to the modified RUNG instruction.

Each of FIGS. 8a–8c show a first scroll bar 230, associated with the C-based window 222, and a second scroll bar 232, associated with the relay ladder logic language window 224. The first and second scroll bars 230 and 232 allow the user to scroll through instructions of the source program so as to scroll through the text and the ladder diagram simultaneously.

While described in terms of editing in and conversion between two languages, embodiments of the present invention can provide editing in and conversion between more than two languages. Such embodiments may include, for example, editing of a sequential function chart representation and a function block diagram representation of the source program.

Further, embodiments of the present invention may be employed as a training tool for learning how to develop source programs in various programming language environments. In said embodiments, the step of compiling the source program into the control program is not necessary.

While the best mode for carrying out the invention has been described in detail, those familiar with the art to which this invention relates will recognize various alternative designs and embodiments for practicing the invention as defined by the following claims.

What is claimed is:

1. A method of generating a control program utilizing a computer system, the control program executable by a controller to control the operation of a one or more devices, the method comprising the steps of:

receiving one or more instructions of a source program in a high-level text-based language;

converting at least one of the one or more instructions into first corresponding instructions in a ladder-based language;

editing the first corresponding instructions of the source program in the ladder-based language to form an edited source program; and compiling the edited source program to form the control program.

2. The method of claim 1 wherein the first corresponding instructions, so converted, can be converted back into the at least one of the one or more instructions in the high-level text-based language.

3. The method of claim 1 wherein the computer system is operated by a user and wherein the step of converting includes:

receiving a first signal generated by a user; and converting the at least one of the one or more instructions of the source program in the high-level text-based language to the first corresponding instructions in the ladder-based language only if the first signal is received.

4. The method of claim 1 wherein the high-level text-based language is a C-based programming language.

5. The method of claim 1 wherein the ladder-based language is a relay ladder logic based language.

6. The method of claim 1 wherein the step of converting includes:

converting the at least one of the one or more instructions of the source program in the high-level text-based language to second corresponding instructions in a lower-level language; and converting the second corresponding instructions of the source program in the lower-level language to the first corresponding instructions in the ladder-based language.

7. The method of claim 1 wherein the step of compiling includes compiling at least one of the source program in the high-level text-based language and the source program in the ladder-based language to form the control program.

8. The method of claim 7 wherein the step of converting includes:

converting the one or more instructions of the source program in the text-based language to second corresponding instructions in a lower-level language; and converting the second corresponding instructions of the source program in the lower-level language to the first corresponding instructions in the ladder-based language;

wherein the step of compiling operates to compile the source program in the lower-level language to form the control program.

9. The method of claim 1 wherein the computer system is operated by a user and wherein the method further comprises the steps of:

receiving a second signal generated by the user; and converting the first corresponding instructions in the ladder-based language, as edited, to third corresponding instructions in the high-level text-based language only if the second signal is received.

10. The method of claim 9 wherein the step of converting the instructions of the source program in the ladder-based language to corresponding instructions in the text-based language includes:

converting the first corresponding instructions of the source program in the ladder-based language, as edited, to second corresponding instructions in a lower-level language; and converting the second corresponding instructions of the source program in the lower-level language to the third corresponding instructions in the high-level text-based language.

11. The method of claim 1 wherein the computer system includes a user-operated editor for editing the instructions of the source program in the text-based language.

12. The method of claim 11 wherein the step of converting is performed automatically if the source program is edited.

13. The method of claim 1 wherein the computer system includes a user-operated editor for editing the first corresponding instructions of the source program in the ladder-based language.

14. The method of claim 13 further comprising the step of converting the first corresponding instructions of the source program in the ladder-based language, as edited, to third corresponding instructions in the high-level text-based language automatically after source program is edited.

15. The method of claim 1 further comprising the step of displaying at least one of the first corresponding instructions of the source program in the ladder-based language as a ladder diagram on a display device in communication with the computer system.

16. The method of claim 15 further comprising the step of displaying at least one of the one or more instructions of the source program in the high-level text-based language as text on the display device.

17. The method of claim 16 wherein the ladder diagram and the text are displayed on the display device simultaneously.

18. The method of claim 17 wherein the ladder diagram corresponds to the same at least one of the one or more instructions of the source program as the text.

19. The method of claim 18 further comprising the steps of:

changing the at least one of the one or more instructions which is displayed by scrolling through the one or more instructions of the source program in response to a third signal generated by a user.

20. A method of bilingually developing a source program and generating a control program therefrom utilizing a computer system, the control program being executable by a controller to control the operation of one or more devices, the method comprising the steps of:

receiving one or more instructions of the source program in a high-level, text-based, non-machine language;

converting the one or more instructions of the source program into first corresponding instructions in a ladder-based language;

editing the first corresponding instructions of the source program in the ladder-based language;

converting the first corresponding instructions, as edited, into second corresponding instructions in the high-level text-based language;

editing the second corresponding instructions of the source program in the high-level text-based language to form an edited source program; and compiling the edited source program to form the control program.

21. The method of claim 20 wherein the high-level text-based language is a C-based programming language.

22. The method of claim 20 wherein the ladder-based language is a relay ladder logic based language.

23. The method of claim 20 wherein the step of converting the one or more instructions includes:

converting the one or more instructions of the source program to third corresponding instructions in a lower-level language; and converting the third corresponding instructions of the source program in the lower-level language to the first corresponding instructions in the ladder-based language.

24. A system for generating a control program utilizing a computer system, the control program executable by a controller to control the operation of a one or more devices, the system comprising:

receiving means for receiving one or more instructions of a source program in a high-level text-based language;

conversion means, in communication with the receiving means, for converting at least one of the one or more instructions of the source program in the high-level text-based language into first corresponding instructions in a ladder-based language;

a user-operated ladder-language editor, in communication with the conversion means, for editing the first corresponding instructions of the source program in the ladder-based language to form an edited source program; and a compiler which compiles the edited source program to form the control program.

25. The system of claim 24 wherein the first corresponding instructions, so converted, can be converted back into the at least one of the one or more instructions in the high-level text-based language.

26. The system of claim 24 wherein the computer system is operated by a user and wherein the conversion means includes:

first signal receiving means for receiving a first signal generated by a user; and means, in communication with first signal receiving means, for converting the at least one of the one or more instructions of the source program in the high-level text-based language to the first corresponding instructions in the ladder-based language only if the first signal is received.

27. The system of claim 24 wherein the high-level text-based language is a C-based programming language.

28. The system of claim 24 wherein the ladder-based language is a relay ladder logic based language.

29. The system of claim 24 wherein the conversion means includes:

means for converting the at least one of the one or more instructions of the source program in the high-level text-based language to second corresponding instructions in a lower-level language; and means for converting the second corresponding instructions of the source program in the lower-level language to the first corresponding instructions in the ladder-based language.

30. The system of claim 24 wherein the compiler compiles at least one of the source program in the high-level text-based language and the source program in the ladder-based language to form the control program.

31. The system of claim 30 wherein the conversion means includes:

means for converting the one or more instructions of the source program in the high-level text-based language to second corresponding instructions in a lower-level language; and means for converting the second corresponding instructions of the source program in the lower-level language to the first corresponding instructions in the ladder-based language;

wherein the compiling means compiles the source program in the lower-level language to form the control program.

32. The system of claim 24 wherein the computer system is operated by a user and wherein the system further comprises:

second signal receiving means for receiving a second signal generated by the user; and means, in communication with the second signal receiving means, for converting the first corresponding instructions of the source program in the ladder-based language, as edited, to third corresponding instructions in the high-level text-based language only if the second signal is received.

33. The system of claim 32 wherein the means for converting the first corresponding instructions of the source program in the ladder-based language to the third corresponding instructions in the high-level text-based language includes:

means for converting the first corresponding instructions of the source program in the ladder-based language, as edited, to second corresponding instructions in a lower-level language; and means for converting the second corresponding instructions of the source program in lower-level language to third corresponding instructions in the text-based language.

34. The system of claim 24 wherein the computer system includes a user-operated text editor for editing the one or more instructions of the source program in the high-level text-based language.

35. The system of claim 34 wherein the conversion means is responsive to the user-operated text editor to automatically convert the one or more instructions of the source program in the high-level text-based language into the first corresponding instructions in the ladder-based language if the source program is edited.

36. The system of claim 24 further comprising means, in communication with user-operated ladder-language editor, for converting the first corresponding instructions of the source program in the ladder-based language to third corresponding instructions in the high-level text-based language automatically if the source program is edited.

37. The system of claim 24 further comprising:

a display device; and first display interfacing means, in communication with the conversion means and the display device, for displaying at least one of the first corresponding instructions of the source program in the ladder-based language as a ladder diagram on the display device.

38. The system of claim 37 further comprising second display interfacing means, in communication with the display device and the receiving means, for displaying at least one of the one or more instructions of the source program in the text-based language as text on the display device.

39. The system of claim 38 wherein first display interfacing means and the second display interfacing means display the ladder diagram and the text on the display device simultaneously.

40. The system of claim 39 wherein the ladder diagram corresponds to the same at least one of the one or more instructions of the source program as the text.

41. The system of claim 40 further comprising:

means, in communication with the first display interfacing means and the second display interfacing means, for changing the at least one of the one or more instructions which is displayed by scrolling through the one or more instructions of the source program in response to a third signal generated by a user.

42. A system for developing a source program bilingually and generating a control program therefrom utilizing a computer system, the control program being executable by a controller to control the operation of one or more devices, the system comprising:

receiving means for receiving one or more instructions of the source program in a high-level, text-based, non-machine language;

first conversion means, in communication with the receiving means, for converting the one or more instructions of the source program into first corresponding instructions in a ladder-based language;

a user-operated ladder-language editor, in communication with the first conversion means, for editing the first corresponding instructions of the source program in the ladder-based language;

second conversion means, in communication with the user-operated ladder-language editor, for converting the first corresponding instructions, as edited, into second corresponding instructions in the high-level text-based language;

a user-operated text editor, in communication with the second conversion means, for editing the second corresponding instructions of the source program in the high-level text-based language to form an edited source program; and a compiler which compiles the edited source program to form the control program.

43. The system of claim 42 wherein the text-based language is a C-based programming language.

44. The system of claim 42 wherein the ladder-based language is a relay ladder logic based language.

45. The system of claim 42 wherein the first conversion means includes:

means for converting the one or more instructions of the source program to third corresponding instructions in a lower-level language; and means for converting the third corresponding instructions of the source program in the lower-level language to the first corresponding instructions in the ladder-based language.

46. The system of claim 42 further comprising:

first signal producing means, in communication with the user-operated ladder-language editor, to produce the first signal if the source program has been edited by a user using the user-operated ladder-language editor, wherein the second conversion means converts the first corresponding instructions into the second corresponding instructions after receiving the first signal.

47. The system of claim 42 wherein the second conversion means includes:

means for converting the first corresponding instructions of the source program in the ladder-based language, as edited, to third corresponding instructions in a lower-level language; and means for converting the third corresponding instructions of the source program in the lower-level language to the second corresponding instructions in the text-based language.

48. The method of claim 20 further comprising the steps of:

displaying the first corresponding instructions of the source program in the ladder-based language, as edited, as a ladder diagram on a display device; and displaying the second corresponding instructions of the source program in the high-level text-based language as text on the display device.

49. The method of claim 48 wherein the ladder diagram and the text are displayed simultaneously and wherein the ladder diagram corresponds to the same at least one of the one or more instructions of the source program as the text.

50. The method of claim 20 further comprising the step of receiving a first signal, wherein the step of converting the first corresponding instructions, as edited, into second corresponding instructions is performed after receiving the first signal.

51. The method of claim 50 wherein the first signal is generated by an action of a user.

52. The method of claim 50 wherein the step of converting the first corresponding instructions of the source program, as edited, into second corresponding instructions in the high-level text-based language includes:

converting the first corresponding instructions of the source program in the ladder-based language to third corresponding instructions in a lower-level language; and converting the third corresponding instructions of the source program in the lower-level language to the second corresponding instructions in the high-level text-based language.

53. The system of claim 42 further comprising:

means for displaying the first corresponding instructions of the source program in the ladder-based language, as edited, as a ladder diagram on a display device; and means for displaying the second corresponding instructions of the source program in the high-level text-based language as text on the display device.

54. The system of claim 53 wherein the first display interfacing means and the second display interfacing means display the ladder diagram and the text simultaneously and wherein the ladder diagram corresponds to the same at least one of the one or more instructions of the source program as the text.

* * * * *